US006871304B2

United States Patent
Hadjihassan et al.

(10) Patent No.: US 6,871,304 B2
(45) Date of Patent: Mar. 22, 2005

(54) METHOD AND APPARATUS FOR ADJUSTING RECEIVER VOLTAGE THRESHOLD AND PHASE SAMPLING POINT USING FEC COUNTS

(75) Inventors: Sevgui Hadjihassan, Kanata (CA); Tom M. Luk, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 404 days.

(21) Appl. No.: 10/216,243

(22) Filed: Aug. 12, 2002

(65) Prior Publication Data

US 2004/0030965 A1 Feb. 12, 2004

(51) Int. Cl.[7] .............................................. G06F 11/00
(52) U.S. Cl. ...................................... 714/704; 375/317
(58) Field of Search ......................... 702/123; 375/347, 375/334, 224, 316, 317; 342/378; 714/704

(56) References Cited

U.S. PATENT DOCUMENTS

| | | | |
|---|---|---|---|
| 4,823,360 A | | 4/1989 | Tremblay et al. ............... 375/4 |
| 5,566,088 A | * | 10/1996 | Herscher et al. ............ 702/123 |
| 5,668,839 A | * | 9/1997 | Bernasconi et al. ......... 375/347 |
| 5,896,391 A | | 4/1999 | Solheim et al. .............. 371/5.1 |
| 5,973,642 A | * | 10/1999 | Li et al. ...................... 342/378 |
| 5,987,075 A | * | 11/1999 | Abe et al. .................... 375/334 |
| 6,178,213 B1 | | 1/2001 | McCormack et al. ........ 375/355 |
| 6,188,737 B1 | | 2/2001 | Bruce et al. ................. 375/355 |
| 6,313,459 B1 | | 11/2001 | Hoffe et al. ............. 250/214 R |
| 6,661,503 B1 | * | 12/2003 | Yamaguchi et al. ........ 356/73.1 |
| 6,700,929 B1 | * | 3/2004 | Shan et al. .................. 375/224 |
| 6,735,259 B1 | * | 5/2004 | Roberts et al. ............. 375/316 |
| 6,735,260 B1 | * | 5/2004 | Eliezer et al. .............. 375/316 |

\* cited by examiner

*Primary Examiner*—David Ton

(57) ABSTRACT

Methods and apparatus are provided for adjusting slicing parameters, such as a voltage threshold and a phase sampling point, used in recovering 1's and 0's from a signal so as to reduce a bit error rate (BER) of the signal. The BER is modelled as a second order polynomial of the slicing parameters. The BER is repeatedly determined from a Forward Error Correction corrected bits counter. For each BER measurement the model is updated, using for example a recursive least squares fit. New values of the slicing parameters are then determined by carrying out an iteration of an optimization, such as a Levenberg-Marquardt optimization, using the model. The new values of the slicing parameters are passed to a Clock and Data Recovery module. Various conditions are checked before updating the model or determining the new values of the slicing parameters, such as changes in signal power or high BERs which exceed the error correction capabilities of the forward error correction.

32 Claims, 8 Drawing Sheets

METHOD AND APPARATUS FOR ADJUSTING RECEIVER VOLTAGE THRESHOLD AND PHASE SAMPLING POINT USING FEC COUNTS

FIELD OF THE INVENTION

This invention relates to data recovery from a digital communication signal, and more particularly to optimization of a slicing threshold and of a phase sampling point.

BACKGROUND OF THE INVENTION

In digital communication systems, data is sent as a series of 1's and 0's. The voltage of an electrical signal is varied so that when a "1" is to be represented the signal has a first voltage, and when a "0" is to be represented the signal has a second voltage. The signal is transmitted by a transmitter and received by a receiver. In optical communication systems, the transmitter converts the electrical signal into an optical signal before transmission, and the receiver converts the optical signal back to an electrical signal. A Clock and Data Recovery module (CDR) recovers the 1's and 0's based on the voltages of the received electrical signal to produce a digital signal, and a Digital Wrapper module (DW) is used for error correction on the digital signal.

Both the optical signal and the electrical signal experience noise during transmission, and so the voltages of the electrical signal received by the CDR are clustered around both the first voltage and the second voltage. The CDR therefore employs a voltage threshold in determining whether the electrical signal is representing a "1" or a "0" at any particular sampling time. For example, if the first voltage (representing a "1") is higher than the second voltage, then if the voltage of the electrical signal is above the threshold the CDR determines that the electrical signal is representing a "1". If the electrical signal is below the threshold the CDR determines that the electrical signal is representing a "0". If noise alters the voltage to the wrong side of the voltage threshold, a error occurs in reproducing the particular "1" or "0". A Bit Error Rate (BER) is a measure of how many errors are occurring during reproduction of the 1's and 0's, i.e. during generation of the digital signal from the electrical signal.

Although it may appear that the voltage threshold should be set at the midpoint of the first voltage and the second voltage in order to minimize the BER, this is not necessarily the case. The level of noise may be dependent on the signal power, particularly in amplified systems or in systems employing Avalanche Photodiodes. If signal-dependent noise exists, then the higher of the first voltage and the second voltage will suffer more noise than the other. This results in an asymmetric eye diagram. See FIG. 1 for an illustration, in which the electrical signal suffers a Gaussian, signal-dependent noise distribution. If the voltage threshold is at the mid-point of the first voltage and the second voltage, then more errors will occur than if the voltage threshold is set lower. Of course some errors may be unavoidable if there is overlap between received voltages of 1's and of 0's, as shown in FIG. 1.

Communication systems therefore attempt to determine an optimum voltage threshold in order to improve receiver sensitivity. The optimum voltage threshold will vary from card to card depending on the type and quality of components on the card. Additionally, the optimum voltage threshold should also be dynamic for each card, so as to adapt to changing noise environment depending on the conditions under which each card is operated, or arising from ageing components or thermal drift.

In order to deal with changing noise environments and the resulting variable asymmetry in the eye diagram, the optimum voltage threshold is preferably determined intermittently. The optimum voltage threshold should also be determined intermittently in order to adjust for changing power levels in the optical portion of an optical communication system, since changing power levels will change the eye diagram if there is signal-dependent noise. One conventional way of doing this is to monitor FEC counters. ITU-T G.709 "Interface for the Optical Transport Network" provides, amongst other standards, a standard for forward error correction. Almost all G.709 compliant DW Application Specific Integrated Circuits (ASICs) generate FEC counters. The FEC counters are an indication of the raw BER before correction. The voltage threshold is adjusted by a voltage step, and the latest FEC counters read and used to estimate a new BER. This is repeated until the BER is minimized. However, a compromise must be made in selecting a voltage step size. The step size is a compromise between convergence time and precision of the optimum. Too small a step size will require many steps, and hence many seconds, to approach the optimum voltage threshold. Too large a step size will result in an imprecise optimum threshold.

Some optimum voltage threshold determination methods use CDR ASICs customized to a particular communication system. See for example U.S. Pat. No. 6,188,737 issued to Bruce et al. on Feb. 13, 2001. However, development of ASICs is costly, risky, and delays time-to-market. Additionally, the CDR ASIC taught by '737 has high power consumption due to duplication of the high-speed serial data path, and has difficulties optimizing the voltage threshold for high BERs. A method which uses widely available commercial CDR chips and FEC chips would be preferable, since no custom chips need to be designed.

In addition to the optimum voltage threshold, communication systems also need to determine an optimum phase sampling point. The optimum phase sampling point is the phase within the eye diagram at which the received voltages corresponding to 1's and the received voltages corresponding to 0's are furthest apart. This is the preferred sampling point for measuring the voltage in order to discriminate between 1's and 0's. If a phase sampling point other than the optimum phase sampling point is used, then the BER can increase as the transition region (between 1's and 0's) is approached. The optimum phase sampling point is coupled to the optimum voltage threshold, and a method of determining optimum parameters which takes advantage of this coupling is preferable to a method which determines each optimum parameter independently.

SUMMARY OF THE INVENTION

The present invention provides a method of determining a value of each of at least one slicing parameter for use in recovering bits in a received signal in a communication system so as to reduce a bit error rate (BER) of the received signal, the received signal having a bit rate and a signal power. The slicing parameters may include a voltage threshold, a phase sampling point, or both. A second order polynomial of the BER as a function of the slicing parameters is generated. Each slicing parameter is initialized to a respective initial value. The BER of the received signal is repeatedly measured from a Forward Error Correction (FEC) corrected bits counter. For each measurement of the BER, the model is maintained and the at least one slicing parameter is adjusted.

In one embodiment, the slicing parameters are adjusted by determining whether the slicing parameters are to be re-initialized. If the slicing parameters are not to be re-initialized the first gradient and the Hessian of the model are determined, and the existence of a minimum within the model is determined from the Hessian and the first gradient. If the slicing parameters are not to be re-initialized and if a minimum exists within the model, the slicing parameters are determined using a Levenberg-Marquardt optimization and the Hessian and the first gradient. If the at least one slicing parameter is not to be re-initialized and if a minimum does not exist within the model, the slicing parameters are determined from the first gradient.

In another embodiment the BER of the received signal is measured by clearing the FEC corrected bits counter. Upon expiry of each of sequential timeframes the FEC corrected bits counter is read, for as long as the FEC corrected bits counter is equal to zero and a number of timeframes less than a maximum number of timeframes has elapsed. If the FEC corrected bits counter is larger than zero, the BER is set equal to the FEC corrected bits counter divided by the product of the timeframe, the number of timeframes for which the FEC corrected bits counter was read, and the bit rate. If the FEC corrected bits counter is equal to zero, the BER is set equal to a nominal value.

In yet another embodiment, the model is maintained by determining whether a change in signal power larger than a signal power change threshold has occurred since the slicing parameters were last adjusted, and by determining whether a prediction of the BER using the model in its current form would be satisfactory. If a change in signal power larger than the signal power change threshold has not occurred and if a prediction of the BER using the model in its current form would not be satisfactory, the model is updated using a recursive least squares fit.

The invention also provides a slicing parameter estimator adapted to carry out the methods of the invention. In one embodiment, the slicing parameter estimator is a digital signal processor. The invention also provides a card adapted to carry out the methods of the invention, the card including a digital signal processor and a forward error correction chip.

The apparatus and methods of the invention provide improved precision and convergence speed in determining the optimum voltage threshold and the optimum phase sampling point, and can be used with commercially available hardware, avoiding the need for expensive ASICs such as custom CDR ASICs. Use of a recursive least squares fit when updating the model avoids computationally expensive inversion of a 6×6 matrix when determining the coefficients of the model. Use of a forgetting factor in updating the model permits rapid convergence of the model to the real BER curves, and permits easy adaptation to new BER curves due to changing operating conditions. Use of a Levenberg-Marquardt optimization provides a good compromise between convergence speed and precision of the slicing parameter values to their optimum values. This compromise allows the method to be used in an in-service path, approaching optimum values of the slicing parameters rapidly without causing large variations in the BER.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
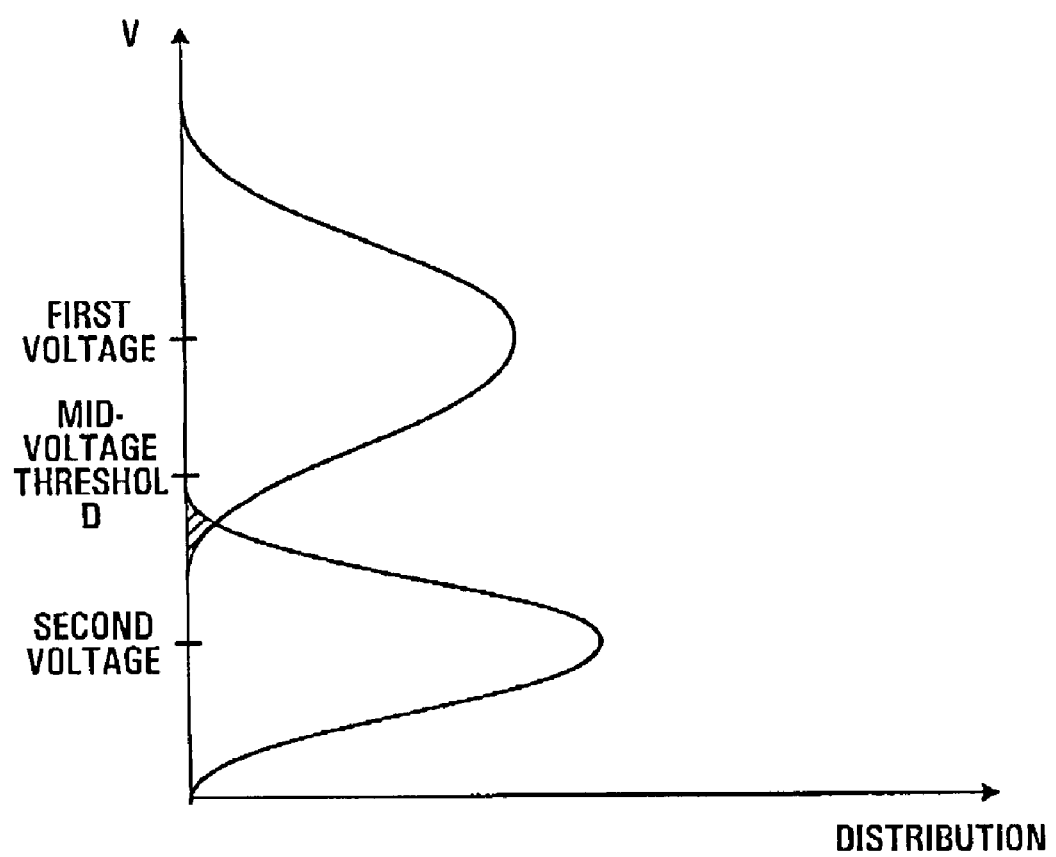
FIG. 1 is a graph of an example voltage distribution in a received electrical signal.
Figure 2:
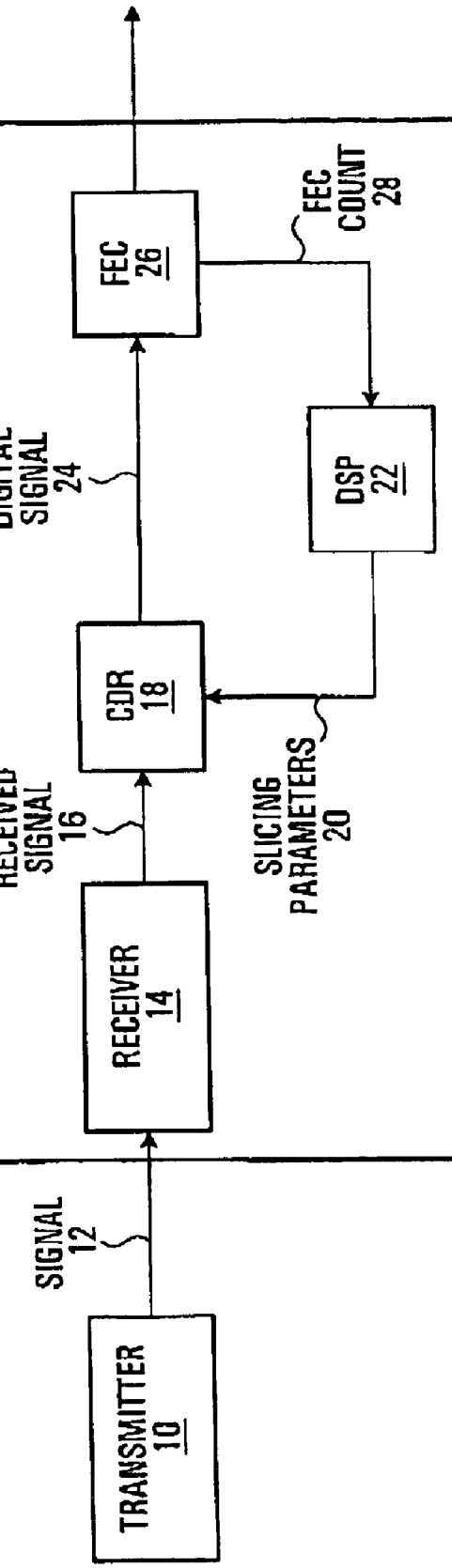
FIG. 2 is a block diagram of a portion of a communication system according to one embodiment of the invention.

Referring to FIG. 2 a block diagram of a portion of a communication system according to one embodiment of the invention is shown. A transmitter 10 transmits a signal 12 to a receiver 14 at a bit rate. The signal 12 may be of any form, including electrical or optical. If the signal 12 is an optical signal, the receiver 14 converts the signal 12 into an electrical received signal 16. The received signal 16 is made up primarily of upper voltages and lower voltages, representing 1's and 0's (usually, but not necessarily, respectively). Due to noise experienced during transmission from the transmitter 10 to the receiver 14, the upper voltages and the lower voltages each cover a respective range of voltages. The receiver 14 passes the received signal 16 to a Clock and Data Recovery chip (CDR) 18. The CDR recovers 1's and 0's from the received signal 16 using at least one slicing parameter value 20 received from a Digital Signal Processor (DSP) 22. Each slicing parameter value corresponds to a slicing parameter. In the preferred embodiment, the at least one slicing parameter includes a voltage threshold and a phase sampling point. The CDR 18 generates a digital signal 24 of 1's and 0's, and passes the digital signal 24 to a Forward Error Correction chip (FEC) 26. The FEC 26 may be any chip capable of performing forward error correction on the digital signal 24 and generating a FEC corrected bits counter 28 (referred to herein simply as a FEC counter), such as a G.709 compliant Digital Wrapper module. The FEC counter 28 indicates how many bits were corrected by the FEC 26 since the FEC counter 28 was previously read. The DSP 22 intermittently reads the FEC counter 28. The DSP 22 is a commercially available DSP, but programmed to determine the at least one slicing parameter value 20 from the FEC counter 28 as described below. The receiver 14, CDR 18, FEC 26, and DSP 22 are typically located on a card 30 within a receiving station.

The method of determining the at least one slicing parameter involves use of a second order polynomial model of the BER as a function of the least one slicing parameter, generated using a least squares fit and preferably a recursive least squares fit. An iteration of an optimization, preferably a second order Levenberg-Marquardt optimization, is performed to determine by how much the at least one slicing parameter values are to be changed. The Levenberg-Marquardt optimization requires knowledge of a first gradient and a Hessian (second gradient) of data points. In the method of the invention, the first gradient and the Hessian are determined analytically from the model. In the preferred embodiment of the invention in which the at least one slicing parameter includes the voltage threshold and the phase sampling point, the model accounts for coupling between the voltage threshold and the phase sampling point, and takes the form of $$z = a_0 + a_1 V + a_2 V^2 + a_3 \phi + a_4 \phi^2 + a_5 V\phi \qquad (1)$$

where z is the BER (all references to the BER herein actually refer to the base 10 logarithm of the BER), $a_0 \ldots a_5$ are constants whose values are to be determined intermittently, V is the voltage threshold, and $\phi$ is the phase sampling point.

Figure 3:
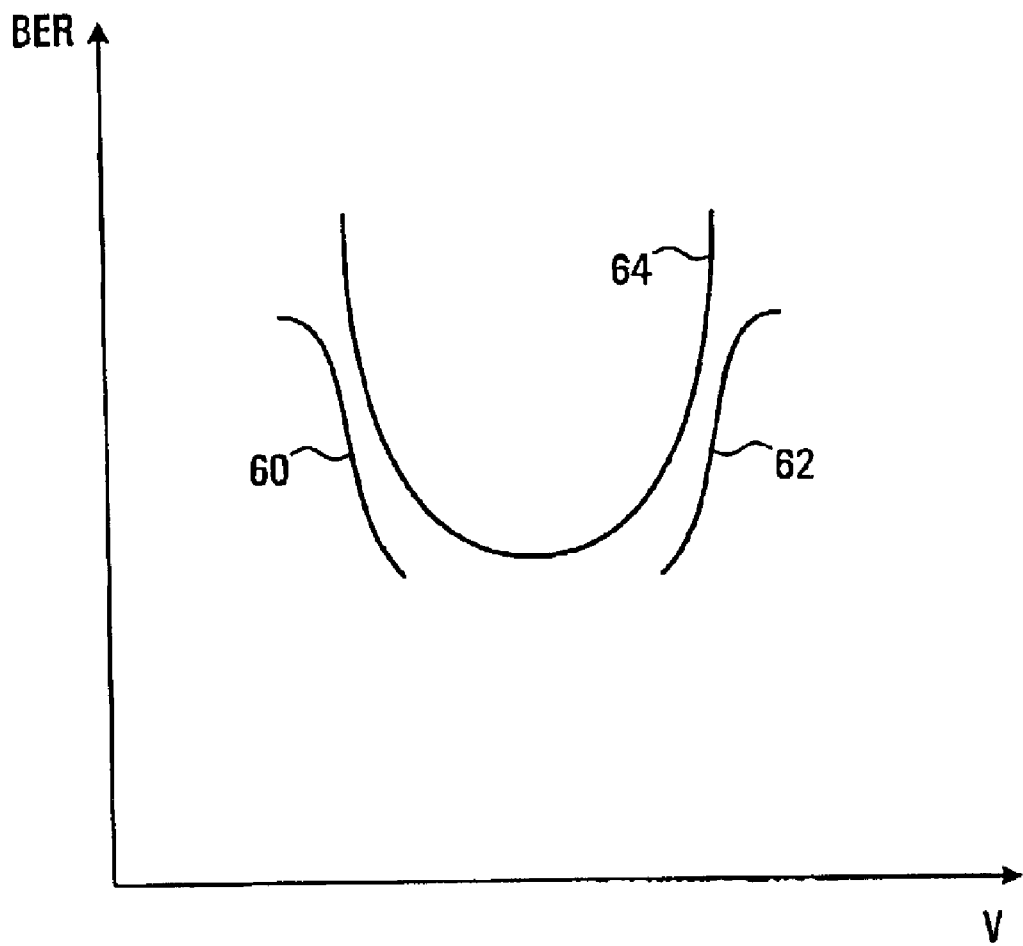
FIG. 3 is an example graph of a model of bit error rate as a function of voltage threshold.

Referring to FIG. 3, a graph of an example model is shown. In the model shown in FIG. 3, the at least one slicing parameter includes only the voltage threshold in order to simplify graphical representation of the model and of the actual data points. Two curves 60 and 62 show actual values of BER as a function of voltage threshold V. Curve 60 increases as V is decreased, since more of the lower voltages will fall above the voltage threshold and be misinterpreted as upper voltages. Curve 62 increases as V is increased, since more of the upper voltages will fall below the voltage threshold and be misinterpreted as lower voltages. The model 64 is a second order polynomial.

Figure 4:
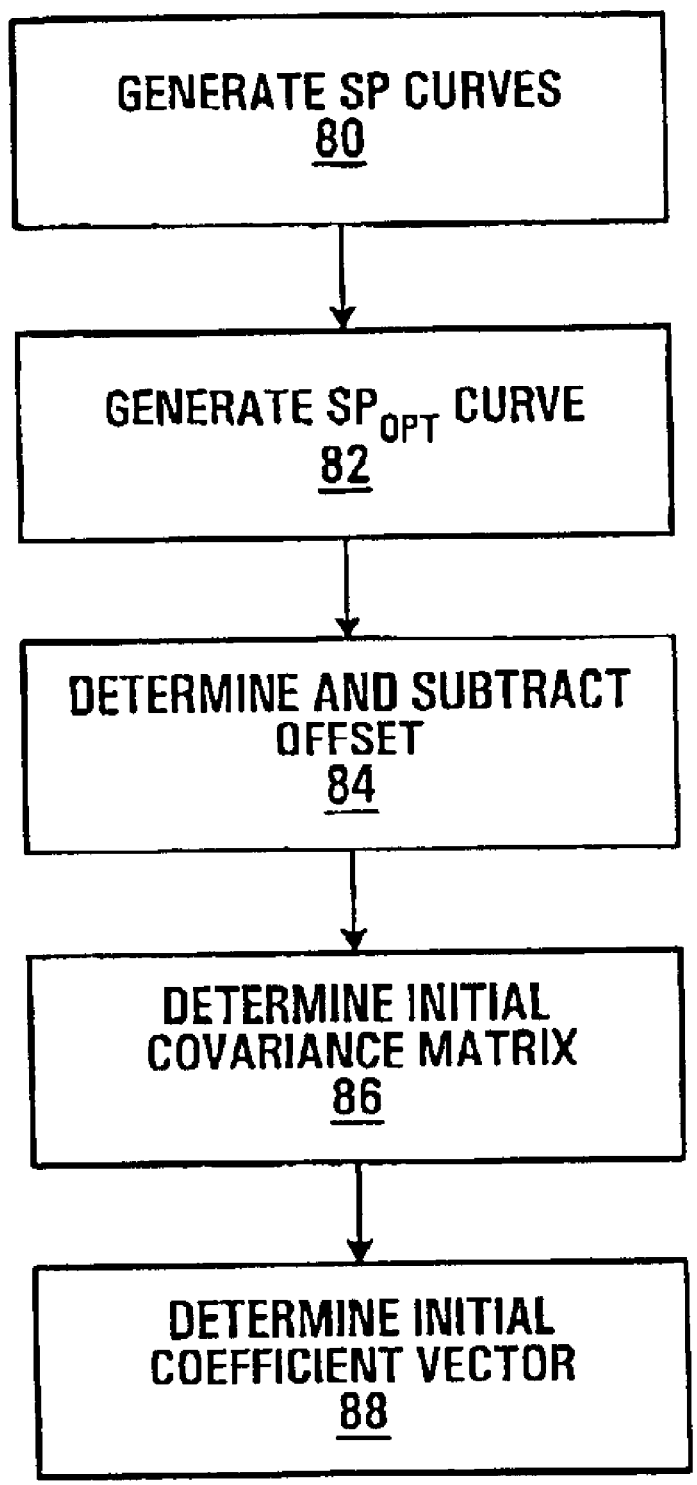
FIG. 4 is a flowchart of a method of performing factory initialization of a Digital Signal Processor according to one embodiment of the invention.

The method of the invention requires initialization of several variables. Referring to FIG. 4, a flowchart of a method of performing factory initialization of the DSP 22 according to one embodiment of the invention is shown. At step 80 plots of BER as a function of each slicing parameter are generated for each of several signal powers spanning an expected range of signal powers, such as between a sensitivity of the receiver and an overload threshold of the receiver. These plots are referred to herein as SP curves, there being a set of SP curves for each of the at least one slicing parameter. The SP curves are preferably generated (either through calibration or through software simulations) in a simulated worst case operation condition At step 82 a second order polynomial model or a look-up table of an optimum slicing parameter value as a function of signal power (referred to herein as an $SP_{opt}$ curve, whether the optimum slicing parameter values are stored is in the form of a polynomial or a look-up table) is generated for each slicing parameter from the minimum of each SP curve in the set corresponding to the slicing parameter. Each $SP_{opt}$ curve represents an approximate optimum slicing parameter over a range of signal powers.

For example, consider the preferred embodiment in which the at least one slicing parameter includes the voltage threshold and the phase sampling point. There will be one SP curve for each of a plurality of signal powers. Each SP curve is a plot of measured BER as a function of voltage threshold and of phase sampling point. For each SP curve, the combination of voltage threshold and phase sampling point which resulted in the lowest measured BER are associated with the signal power of the SP curve. When carried out for all SP curves, a series of points (V, $\phi$, P) (P being the signal power) are generated. The $SP_{opt}$ curve for the voltage threshold (the $V_{opt}$ curve) is found by plotting the voltage thresholds as a function of the signal power (ignoring the phase sampling points), and then either populating a look-up table or fitting the voltage thresholds and signal powers to a polynomial. Similarly, the $SP_{opt}$ curve for the phase sampling point (the $\phi_{opt}$ curve) is found by plotting the phase sampling point as a function of the signal power (ignoring the voltage thresholds).

The $SP_{opt}$ curves are particular to the card for which it is measured. The $SP_{opt}$ curves will differ between cards due to variations in components on the cards. The optimum slicing parameters at very low signal power are in an ideal card at the centre of an eye diagram, and will vary about the centre of the eye diagram from card to card. At step 84 at least one offset for the card is found by comparing the slicing parameter values of the previously generated $SP_{opt}$ curves at a low signal power with the slicing parameter values corresponding to the centre of the eye diagram. There will be one offset corresponding to each slicing parameter, and therefore to each $SP_{opt}$ curve. Each $SP_{opt}$ curve is then adjusted by subtracting the corresponding offset from all points of the $SP_{opt}$ curve, thereby shifting the $SP_{opt}$ curve up or down so that the slicing parameter at low power is at the centre of the eye diagram. Once adjusted, the at least one $SP_{opt}$ curve is then closer to an at least one average $SP_{opt}$ curve for all cards. The at least one offset and the polynomial coefficients of the at least one average $SP_{opt}$ curve are stored within the DSP 22.

At step 86 an initial covariance matrix $C_{init}$ is determined. The initial covariance matrix is determined by first defining a slicing parameter data matrix $$D = \begin{bmatrix} 1 & V_1 & V_1^2 & \phi_1 & \phi_1^2 & V_1\phi_1 \\ 1 & V_2 & V_2^2 & \phi_2 & \phi_2^2 & V_2\phi_2 \\ \vdots & \vdots & \vdots & \vdots & \vdots & \vdots \\ 1 & V_n & V_n^2 & \phi_n & \phi_n^2 & V_n\phi_n \end{bmatrix}$$

where the subscripts 1 . . . n refer to different data points within one of the measured SP curves, preferably a SP curve corresponding to a signal power in the lower half of the signal power range. It will be noted that each row contains the factors by which the coefficients of the model are multiplied. If the at least one slicing parameter includes different or additional slicing parameters, then the slicing parameter data matrix will vary accordingly. A BER data vector is defined as $$Z_{data} = \begin{bmatrix} BER_1 \\ BER_2 \\ \vdots \\ BER_n \end{bmatrix}$$

where each element of the BER data vector is a measured value of the BER from the same SP curve used to generate the slicing parameter data matrix, each BER element corresponding to one of the n data points in the slicing parameter matrix. In other words, the slicing parameter data matrix and the BER data vector are created from a series of data points ($BER_i$, $V_i$, $\phi_i$) from one of the SP curves. When generating the data matrix D and the data vector $Z_{data}$ it is important that data points with a BER corresponding to a FEC saturation BER region not be used.

The initial covariance matrix $C_{init}$ is then determined from an expression $$C_{init} = (D^T D)^{-1}$$

where $D^T$ is the transpose of the data matrix D. At step 88 an initial coefficient vector $B_{init}$ is determined from an expression $$B_{init} = C D^T Z_{data}.$$

The initial covariance matrix and the initial coefficient vector are stored in the DSP 22, and will be used when updating the model as described below.

The factory initialization method described above with reference to FIG. 4 is applied only to a reference card. The $SP_{opt}$ curves, initial covariance matrix, initial coefficient vector, and maximum step size curve determined for the reference card are loaded into the DSP 22 of all other cards. Only the offset of each card is actually determined individually, in the same way as for the reference card as described above with reference to step 84.

Figure 5:
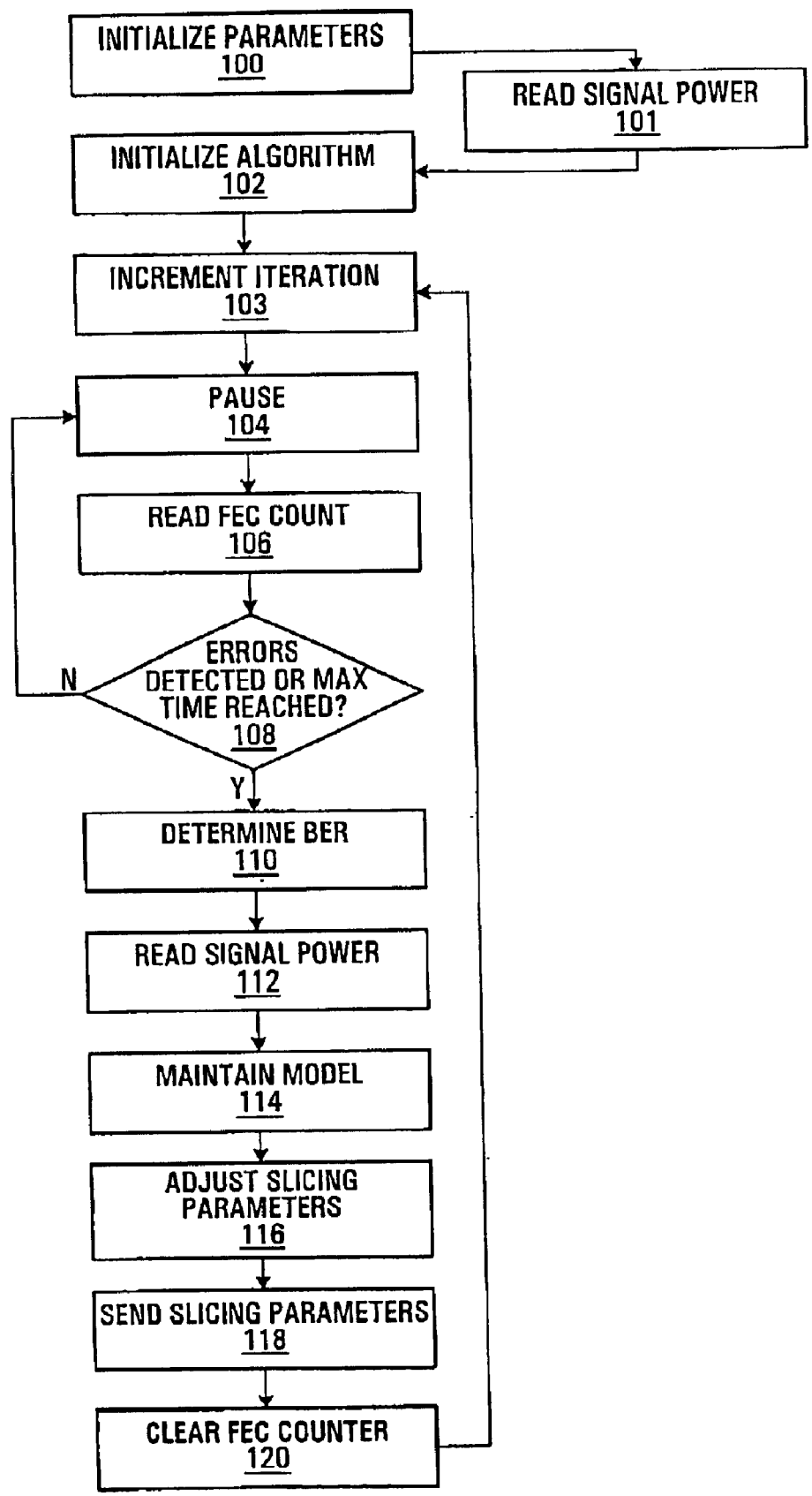
FIG. 5 is a flowchart of a method of repeatedly updating at least one slicing parameter value according to one embodiment of the invention.

Referring to FIG. 5, a high-level method of repeatedly updating the at least one slicing parameter value according to one embodiment of the invention is shown. The method is preferably carried out by the DSP 22 of FIG. 2. At step 100 the DSP 22 initializes a plurality of algorithm parameters which are used in updating the model and in determining the at least one slicing parameter. The value of a stepping parameter β is set to a value between zero and infinity, depending on the magnitude of the step to be taken in an iteration of the Levenberg-Marquardt optimization. The optimal value of the stepping parameter for a particular application can be found through experimentation. As an example, a value between "1" and "3" has been found to be appropriate. The value of the stepping parameter β is constant.

The value of a timeframe for corrected error accumulation within the FEC 26 is set. The timeframe is a factor in how many corrected errors are used when estimating a BER, as described in more reference below to step 104. A lower value of the timeframe normally accelerates convergence on the optimum slicing parameters at the expense of processing load on the DSP 22. Since the method of the invention finds the optimum slicing parameters particularly quickly, often in less than ten iterations, a longer than usual timeframe can be used, such as 100 ms.

The value of a power change threshold ΔP is set. The power change threshold is a threshold used to determine whether the signal power has decreased dramatically enough that use of the most recent slicing parameter values will lead to a high BER, and possibly even to a loss of sync. A value of 3 dB for ΔP has been found to be appropriate.

The value of a forgetting factor ρ is set to a value between "0" and "1", depending on how much weight is to be given to previous measurements of BERs and corresponding slicing parameters (a higher value of ρ corresponding to greater weight being given to previous measurements). The optimal value of the forgetting factor for a particular application can be found through experimentation. A value of around "0.0001" has been found to be appropriate. The value of the forgetting factor ρ is constant.

A BER precision threshold curve is defined. The BER precision curve provides a BER precision threshold (described in more detail below with reference to step 130 of FIG. 6) as a function of a measured BER. The BER precision threshold curve reflects that the precision of a measured BER deteriorates as the measured BER decreases, due to greater fluctuations between measurements of the BER. Since the precision of the measured BER increases with the timeframe, the BER precision threshold curve will depend on the timeframe used. The BER precision threshold curve is defined experimentally for the timeframe, and loaded into the DSP 22 in any manner, such as a look up table or a set of polynomial coefficients.

A maximum step size curve is defined for each of the at least one slicing parameter. Each maximum step size curve provides a maximum step size as a function of a signal power. Each curve reflects that there should be an upper limit to the step taken during each iteration of the optimization when determining the respective slicing parameter value. Unlike many optimization applications in which the sole goal is to reach the optimum as quickly as possible, the method of the invention must also prevent important variations in system performance. Variations in BER determined by optimization of the model should be limited to 1 to 2 decades. The maximum step size should generally increase with signal power. The maximum step size curves may be defined by a designer and loaded into the DSP 22 in any manner, such as a look up table or a set of polynomial coefficients.

At step 101 the DSP 22 reads a signal power of the signal 12. The signal power is determined from other components on the card 30, for example a photodiode within the receiver.

At step 102 the DSP 22 initializes the methods of updating the model and of determining the at least one slicing parameter. A covariance matrix $C_0$ is set equal to the initial covariant matrix $C_{init}$ determined at step 86 of FIG. 4. A coefficient vector $B_0$ is set equal to the initial coefficient vector $B_{init}$ determined at step 89 of FIG. 4. The subscript "0" of the covariance matrix $C_0$ and the coefficient vector $B_0$ refers to an iteration number, in this case the initialization iteration. More generally, the covariance matrix and the coefficient matrix are referred to as $C_k$ and $B_k$ respectively.

Each at least one slicing parameter value is set to an initial value by adjusting the corresponding average $SP_{opt}$ curve (defined by the coefficients stored at the steps 82 and 84 of FIG. 4) by adding the offset of the card, and then using the signal power read at step 101 as an argument to the adjusted $SP_{opt}$ curve. This moves the $SP_{opt}$ curve to reflect the offset of the card from the centre of the eye diagram at low signal power. The DSP 22 sends the at least one slicing parameter initialized in this way to the CDR 18.

The value of a latest BER (BER_Last) is set to zero. The value of BER_Last represents the value of the BER when the model was most recently updated.

Finally, the DSP 22 clears the FEC counter 28.

Each iteration is referred to by an iteration number k, often appearing as a subscript to a variable, such that iteration k follows iteration k−1. Initially, k has a value of "0" At step 103 the iteration number is incremented by "1". During the first iteration (in which k=1) reference to the previous iteration (for example, to $C_0$) refer to values set during initialization. The use of an iteration number is used primarily for describing the method of the invention. Other means of updating various parameters may be used, such as steps of the form $$P_{new}=f(P_{old})$$

$$P_{old}=P_{new}$$

where P is any parameter.

At step 104 the DSP 22 pauses for a duration equal to the timeframe set at the step 100 of initializing the algorithm parameters. This pause is necessary to allow the FEC 26 to perform a sufficient number of error corrections that the FEC counter 28 will allow a reasonable estimation of the BER, and is the time between clearing of the FEC counter 28 and reading of the FEC counter 28.

At step 106 the DSP 22 reads the FEC counter 28 from the EEC 26. At step 108 the DSP 22 determines whether the FEC counter 28 is larger than zero (in other words, whether any errors were corrected by the FEC 26 since the FEC counter 28 was last read) or a maximum number of timeframes have passed. If the FEC counter 28 is not larger than zero, then a BER can not be estimated. If a maximum number of timeframes have passed, then too much time is passing and any future FEC counter 28 reading larger than zero will result in a BER far too small to update the model meaningfully or to result in meaningful slicing parameter adjustment. If at step 108 the FEC counter 28 is not larger than zero and the maximum number of timeframes have not elapsed, then at step 104 the DSP 22 again pauses for a duration of time equal to the timeframe.

If the FEC counter 28 is larger than zero or the maximum number of timeframes have elapsed at step 108, then at step 110 the DSP 22 estimates a current value $BER_k$ of the BER. If the FEC counter 28 is larger than zero the current value of the BER is found by dividing the FEC counter 28 by the total duration in seconds of all timeframes which passed while waiting for at least one error to be detected by the FEC 26 multiplied by the bit rate of the signal 12. In other words, $$BER_k = \frac{FEC \text{ counter}}{total \text{ timeframes} \times \text{bit rate}}.$$

This method of estimating the current value of the BER yields a value very close to the actual BER. While this method is limited by saturation of the ability of the FEC 26 to perform forward error correction at a BER of about −3 (for a G.709 compliant FEC), when a G.709 compliant FEC 26 is used the method of the invention is carried out in environments in which the BER is less than −4 since $10^{-15}$ after correction is required. This method of estimating the BER also results in fluctuations between consecutive measurements for low values of the actual BER, particular for low timeframes. For this reason, a BER precision threshold is defined later for use when applying the current value of the BER, as described below.

If the FEC counter 28 is equal to zero at step 110 the DSP 22 sets the current value of the BER to a nominal value between −10 (for say a 100 ms timeframe) and −11 (for say a 1 s timeframe) when the predefined maximum number of timeframes is less than 10. Although this may result in non-optimal slicing parameter values, with such low FEC corrected bit counts (which reflects the raw BER before FEC correction) the BER after correction will be less than $10^{-70}$, far below the usual target of $10^{-15}$.

At step 112 the DSP 22 reads a signal power $P_k$ from the card 30. At step 114 the DSP 22 maintains the model, as described in more detail below with reference to FIG. 6. The step 114 of maintaining the model will usually update the model, but may under certain circumstances re-initialize the model or simply preserve the model. Any least squares based method of updating the model can be used, such as performing a least squares fit using stored BERs and slicing parameters, but in the preferred embodiment a recursive least squares fit with a forgetting factor is used unless certain constraints are violated, as described in more detail below with reference to FIG. 6.

At step 116 the DSP 22 adjusts the at least one slicing parameter value by performing one iteration of an optimization, preferably a Levenberg-Marquardt optimization as described below with reference to FIG. 7. By performing an iteration of the Levenberg-Marquardt optimization, new slicing parameter values can be determined which are usually closer to optimum slicing parameter values than are the current slicing parameter values. At step 118 the DSP 22 sends each of the at least one slicing parameter value to the CDR 18. At step 120 the DSP 22 clears the FEC counter 28 by reading the FEC counter 28 and discarding the value read. The DSP 22 then begins a new iteration at step 103.

Figure 6:
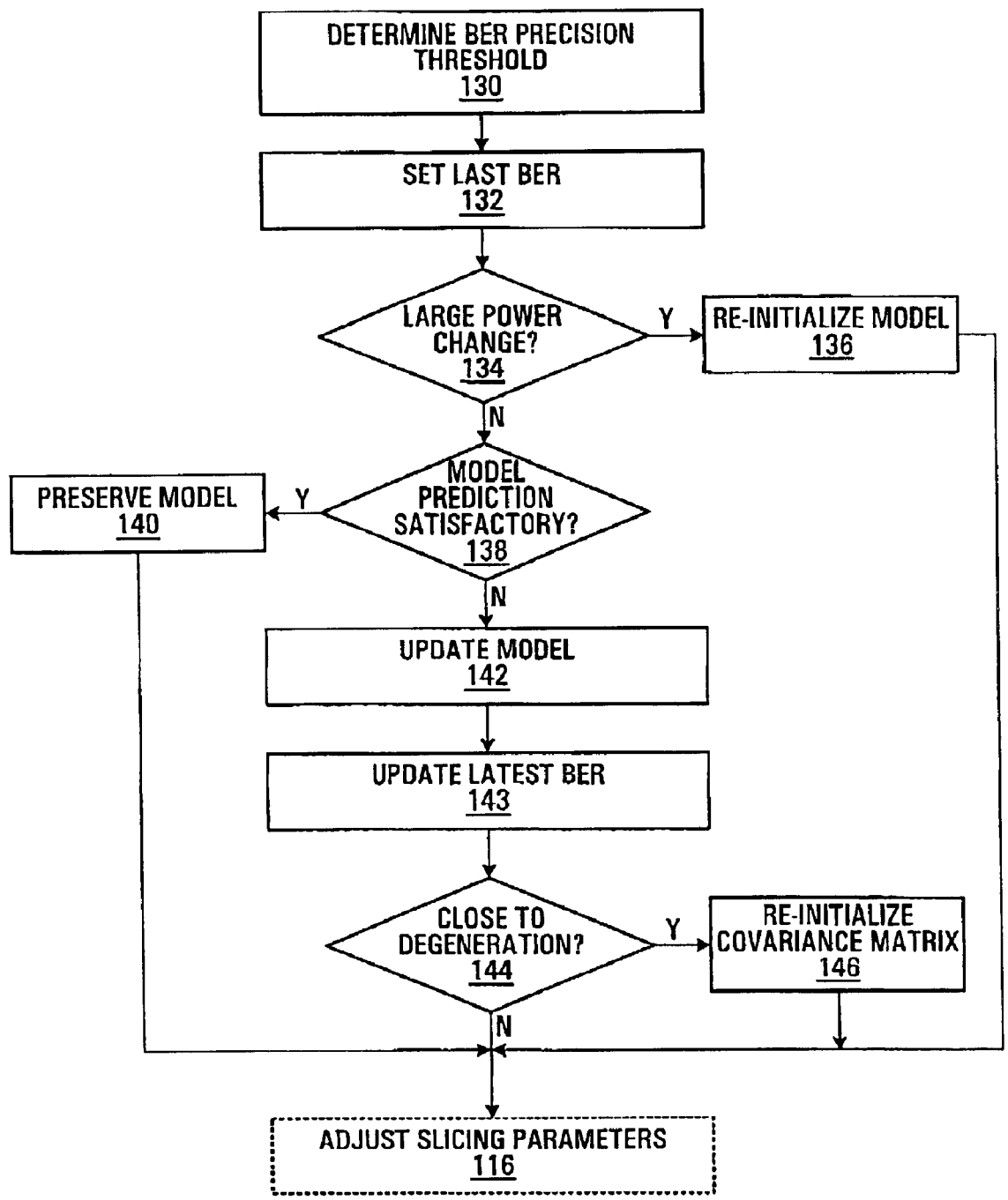
FIG. 6 is a flowchart of a method of maintaining a model of BER as a function of at least one slicing parameter according to one embodiment of the invention.

Referring to FIG. 6, a method of maintaining the model according to one embodiment of the invention is shown. The method is carried out by the DSP 22 at the step 114 of FIG. 5 of maintaining the model. At step 130 the DSP 22 determines a BER precision threshold $\Delta BER_k$. The BER precision threshold reflects the precision of use of the FEC counter 28 for estimation of the BER (described above with respect to step 110 of FIG. 5). The BER precision threshold is determined as a function of the estimated $BER_k$ determined at step 110 of FIG. 5 using the BER precision threshold curve generated during intitialization of parameters at step 100 of FIG. 5

At step 132 the current value of the last BER, $BER\_Last_k$, is set equal to the previous value of the last BER, $BER\_Last_{k-1}$, as a default in case the model is not updated during this iteration.

At step 134 the DSP 22 determines whether a change in signal power larger than the power change threshold has occurred since the at least one slicing parameter value was last adjusted. This can be determined roughly by comparing the signal power with the signal power read during the previous iteration, $$|P_k - P_{k-1}| \geq \Delta P$$

where $P_k$ is the signal power during the current iteration and $P_{k-1}$ is the signal power during the previous iteration. If a change in signal power larger than the power change threshold has occurred, then the model is re-initialized at step 136 by setting the covariance matrix $C_k$ and the coefficient vector $B_k$ equal to the initial covariance matrix $C_{init}$ and the initial coefficient vector $B_{init}$ respectively. The DSP 22 then adjusts the at least one slicing parameter value at step 116 of FIG. 5.

If a change in signal power larger than the power change threshold has not occurred, then at step 138 the DSP 22 determines whether prediction based on the model in its current form is satisfactory. Three conditions are checked in order to make this determination. First, if the BER is above a limit imposed by error correction capabilities of the FEC 26, then the measured BER is unreliable and should not be used to update the model. Second, if the BER is unchanged from the value of the BER when the model was last updated ($BER\_Last_k$), then updating of the model will result in a linear model which should not be used to determine the at least one slicing parameter. Practically, this condition only occurs when the BER has been artificially set. It is very unlikely that two consecutive measured BERs would have identical values. Third, if the BER predicted by the model differs from the measured BER by less than the BER precision threshold determined at step 130, then predictions using the model in its current form are at least as good as fluctuations in the measurement of the BER. This third condition helps prevent the model from oscillating around the optimum values of the slicing parameters once they have been reached. In other words, the model should not be updated if $$(BER_k > -3) \text{ or } (BER_k - BER\_Last_k = 0) \text{ or } (|z_k - BER_k| < \Delta BER_k) \quad (2)$$

where $z_k$ is the BER as predicted from the current model using the current slicing parameter values.

If the expression (2) is satisfied at step 138, then the DSP 22 preserves the model at step 140 by setting $C_k$ equal to $C_{k-1}$ and by setting $B_k$ equal to $B_{k-1}$. The DSP 22 then adjusts the at least one slicing parameter value at step 116 of FIG. 5.

If the expression (2) is not satisfied, then the DSP 22 updates the model at step 142 using the BER determined at step 110 of FIG. 5 (BER$_k$) and the current at least one slicing parameter value to determine new coefficients in the second order polynomial. In the preferred embodiment, a recursive least squares fit with a forgetting factor is used to update the model, thereby avoiding the extensive full least squares fit used to initialize the model at steps 86 and 88 of FIG. 4. The DSP 22 defines a data vector $f_k$ to include the factors by which the coefficients are multiplied in the model when determining a predicted BER.

The DSP 22 then determines new values for the coefficient vector $B_k$ using an expression $$B_k = B_{k-1} + \frac{C_{k-1} f_k}{\rho + f_k^T C_{k-1} f_k} (BER_k - f_k^T B_{k-1})$$

where $\rho$ is the forgetting factor whose value was set at step 100 of FIG. 5, $f_k^T$ is the transpose of the data vector $f_k$, $B_{k-1}$ is the coefficient vector generated during the last iteration (or as initialized if this is the first iteration), and $C_{k-1}$ is the covariance matrix generated during the last iteration (or as initialized if this is the first iteration). It may be noted that the final factor $(BER_k - f_k^T B_{k-1})$ is equal to the difference between the measured BER and the BER as predicted from the previous version of the model.

The DSP 22 then updates the covariance matrix $C_k$ using an expression $$C_k = \frac{1}{\rho}\left(C_{k-1} - \frac{C_{k-1} f_k f_k^T C_{k-1}}{\rho + f_k^T C_{k-1} f_k}\right).$$

For the preferred embodiment in which the at least one slicing parameter includes a coupled voltage threshold and phase sampling point and the model of the BER is defined by equation (1) above, the data vector and the coefficient vector are given by $$f_k = \begin{bmatrix} 1 \\ V_{k-1} \\ V_{k-1}^2 \\ \phi_{k-1} \\ \phi_{k-1}^2 \\ V_{k-1}\phi_{k-1} \end{bmatrix} \text{ and } B_k = \begin{bmatrix} a_0 \\ a_1 \\ a_2 \\ a_3 \\ a_4 \\ a_5 \end{bmatrix}$$

respectively, where the subscript k–1 indicates that value of the voltage threshold and of the phase sampling point determined during the last iteration are to be used in the data vector.

At step 143 the DSP 22 updates the value of the latest BER (the BER when the model was most recently updated) by setting its value to the current value of the measured BER.

The covariance matrix $C_k$ is the inverse of what is commonly referred to as an information matrix. If the information matrix is ill-conditioned or singular, then the covariance matrix $C_k$ does not exist and should be re-initialized. Because the DSP 22 is estimating the covariance matrix with a recursive algorithm without building and inverting the information matrix, the DSP 22 must determine whether the covariance matrix is to be re-initialized by examining the covariance matrix itself rather than the information matrix. Accordingly, at step 144 the DSP 22 determines whether the covariance matrix is close to degeneration. This can be done by comparing the determinant of the covariance matrix to a threshold determined experimentally.

If the DSP 22 determines at step 144 that the covariance matrix is not close to degeneration then the DSP 22 adjusts the at least one slicing parameter value at step 116 of FIG. 5. If the DSP 22 determines at step 144 that the covariance matrix $C_k$ is close to degeneration, then at step 146 the DSP 22 re-initializes the covariance matrix C by setting it equal to the initial covariance matrix $C_{init}$. The DSP 22 then adjusts the at least one slicing parameter value at step 116 of FIG. 5.

Figure 7:
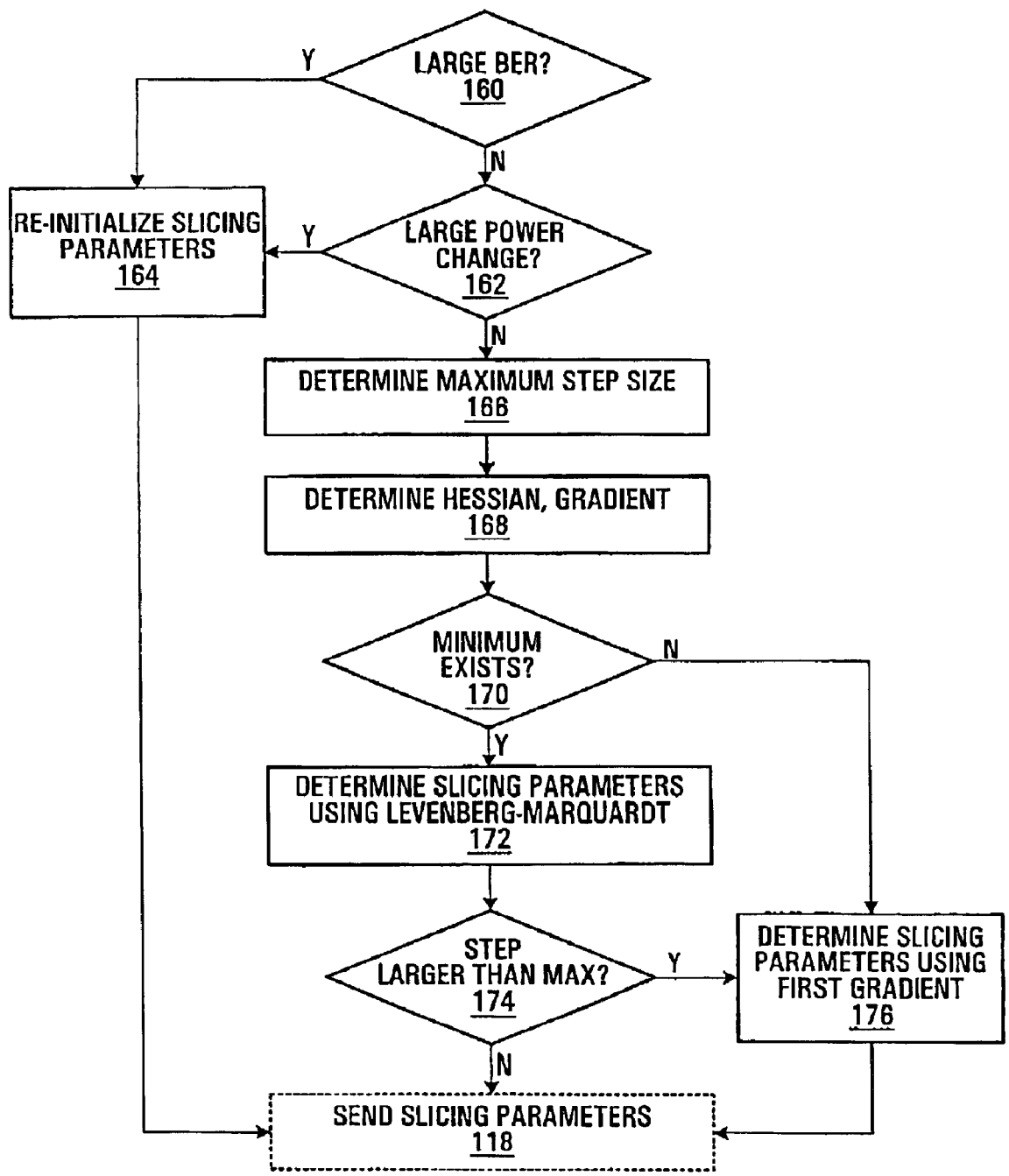
FIG. 7 is a flowchart of a method of adjusting at least one slicing parameter value according to one embodiment of the invention.

Referring to FIG. 7, a flowchart of a method of adjusting at least one slicing parameter value according to one embodiment of the invention is shown. Generally, the method performs one iteration of a Levenberg-Marquardt optimization unless the model does not contain a minimum, in which case the method performs one iteration of a first gradient optimization.

At step 160 the DSP 22 determines whether the measured BER is beyond the error correction capabilities of the FEC 26, in other words, whether BER$_k$>−3. If the measured BER is within the error correction capabilities of the FEC 26, then the DSP 22 determines at step 162 whether there has been a large change in signal power since the at least one slicing parameter was last adjusted, in other words, whether $$|P_k - P_{k-1}| \geq \Delta P.$$

If the measured BER is beyond the error correction capabilities of the FEC 26 or if there has been a large change in signal power since the last iteration, then the DSP 22 re-intializes the at least one slicing parameter value at step 164. If there has been a large change in signal power, then the DSP 22 re-initializes the at least one slicing parameter value by adjusting the corresponding average SP$_{opt}$ curve by the offset of the card, and then using the signal power as an argument to the adjusted SP$_{opt}$ curve. If the measured BER is beyond the error correction capabilities of the FEC 26, then the DSP 22 re-initializes the at least one slicing parameter value by setting it to the offset of the card. The offset is the at least one slicing parameter value for which the DSP 22 can obtain a measurable BER from the FEC 26 when the signal power is not beyond a sensitivity point. The DSP 22 then sends the at least one slicing parameter value to the CDR 18 at step 118.

If the measured BER is within the error correction capabilities of the FEC 26 and if there has been no large change in signal power since the last iteration, then the at least one slicing parameter value can be determined from an optimization of the model. At step 166 the DSP 22 determines a maximum step size for each of the at least one slicing parameter using the current signal power and the maximum step size curves generated during initialization of parameters at step 100 of FIG. 5.

At step 168 the DPS 22 determines the Hessian of the model. For the preferred embodiment in which the at least one slicing parameter includes a coupled voltage threshold and phase sampling point (see equation (1) above), the Hessian is defined as $$H(V, \phi) = \begin{bmatrix} \frac{\partial^2 z}{\partial V^2} & \frac{\partial^2 z}{\partial V \partial \phi} \\ \frac{\partial^2 z}{\partial \phi \partial V} & \frac{\partial^2 z}{\partial \phi^2} \end{bmatrix}.$$

For the model of the BER defined by equation (1) above, this equals $$H = \begin{bmatrix} 2a_2 & a_5 \\ a_5 & 2a_4 \end{bmatrix}$$

where $a_2$, $a_4$, and $a_5$ are defined within the coefficient vector $B_k$.

The DSP 22 also determines the first gradient of the model. For the preferred embodiment in which the at least one slicing parameter includes a coupled voltage threshold and phase sampling point (see equation (1) above), the first gradient is defined as $$\nabla z(V, \phi) = \begin{bmatrix} \frac{\partial z}{\partial V} \\ \frac{\partial z}{\partial \phi} \end{bmatrix}.$$

For the model of the BER defined by equation (1) above, this equals $$\nabla z(V, \phi) = \begin{bmatrix} a_1 + 2a_2 V + a_5 \phi \\ a_3 + 2a_4 \phi + a_5 V \end{bmatrix}$$

where $a_2$, $a_4$, and $a_5$ are defined within the coefficient vector $B_k$.

At step 170 the DSP 22 determines whether a minimum exists within the model. A minimum exists within the model if the inverse of the Hessian is positive definite. If there is only one slicing parameter this simplifies to determining whether the coefficient of the second order term in the model is positive definite, a minimum existing if the coefficient of the second order term is positive definite. If there are two slicing parameters, then the Hessian is positive definite if the coefficients of the two second order single variable terms are positive, and if the product of the coefficients of the two second order single variable terms is larger than the coefficient of the second order dual variable term. For example, in the model described by equation (1) above, a minimum will exist if $a_2$ and $a_4$ are larger than zero and if $a_2 a_4$ is larger than $a_5$.

If the DSP 22 determines at step 170 that a minimum exists within the model, then at step 172 the DSP 22 determines the at least one slicing parameter value using an iteration of a Levenberg-Marquardt optimization. The at least one slicing parameter value is updated using an expression $$\underline{x}_k = \underline{x}_{k-1} - [H(\underline{x}_{k-1}) + \beta E]^{-1} \nabla z(\underline{x}_{k-1})$$

where $x_{k-1}$ is a vector of the current at least one slicing parameter value, $\underline{x}_k$ is a vector of the new at least one slicing parameter value, $\beta$ is the stepping parameter set at step 100 of FIG. 5, and E is a unitary matrix. For the preferred embodiment in which the at least one slicing parameter includes a coupled voltage threshold and phase sampling point and the model of the BER is defined by equation (1) above, the new values of the voltage threshold and of the phase sampling point are given by $$\begin{bmatrix} V_k \\ \phi_k \end{bmatrix} = \begin{bmatrix} V_{k-1} \\ \phi_{k-1} \end{bmatrix} + \begin{bmatrix} 2a_2 + \beta & a_5 \\ a_5 & 2a_4 + \beta \end{bmatrix}^{-1} \begin{bmatrix} a_1 + 2a_2 V_{k-1} + a_5 \phi_{k-1} \\ a_3 + 2a_4 \phi_{k-1} + a_5 V_{k-1} \end{bmatrix}.$$

A step 174 the DSP 22 determines for each slicing parameter whether use of the Levenberg-Marquardt optimization has resulted in a step size larger than the maximum step size for the slicing parameter determined at step 168. In the preferred embodiment in which the at least one slicing parameter includes a voltage threshold and a phase sampling point, the DSP 22 determines whether $|V_k - V_{k-1}| > \Delta V_{max}$ and whether $|\phi_k - \phi_{k-1}| > \Delta \phi_{max}$.

If use of the Levenberg-Marquardt optimization has not resulted in a step size larger than the maximum step size for any of the at least one slicing parameter, then the new slicing parameter values determined at step 172 are kept and the DSP 22 sends the new slicing parameter values to the CDR 18 at step 118 of FIG. 5.

If use of the Levenberg-Marquardt optimization has resulted in a step size larger than the maximum step size for any of the at least one slicing parameter, or if the DSP 22 determined at step 170 that no minimum existed within the model, then the DSP 22 determines the new slicing parameter values at step 176 using only the first gradient determined at step 168. The first gradient is used to determine the direction of the change in the at least one slicing parameter value, while the magnitude of the change in the slicing parameters is set to be the maximum step size. The DSP 22 determines the new slicing parameter values using an expression $$\underline{x}_k = \underline{x}_{k-1} - |\Delta x_{max}| \frac{\nabla z(\underline{x}_{k-1})}{|\nabla z(\underline{x}_{k-1})|}$$

where $\Delta x_{max}$ a is a vector of maximum step sizes of the slicing parameters.

In the preferred embodiment in which the at least one slicing parameter includes a voltage threshold and a phase sampling point, this becomes $$\begin{bmatrix} V_k \\ \phi_k \end{bmatrix} = \begin{bmatrix} V_{k-1} \\ \phi_{k-1} \end{bmatrix} - \text{scaling} \times \begin{bmatrix} a_1 + 2a_2 V_{k-1} + a_5 \phi_{k-1} \\ a_3 + 2a_4 \phi_{k-1} + a_5 V_{k-1} \end{bmatrix}$$

where scaling is a scaling factor given by $$\text{scaling} = \frac{\left\| \begin{bmatrix} \Delta V_{max} \\ \Delta \phi_{max} \end{bmatrix} \right\|}{\left\| \begin{bmatrix} a_1 + 2a_2 V_{k-1} + a_5 \phi_{k-1} \\ a_3 + 2a_4 \phi_{k-1} + a_5 V_{k-1} \end{bmatrix} \right\|}.$$

The DSP 22 then sends the new slicing parameter values to the CDR 18 at step 118 of FIG. 5.

Figure 8:
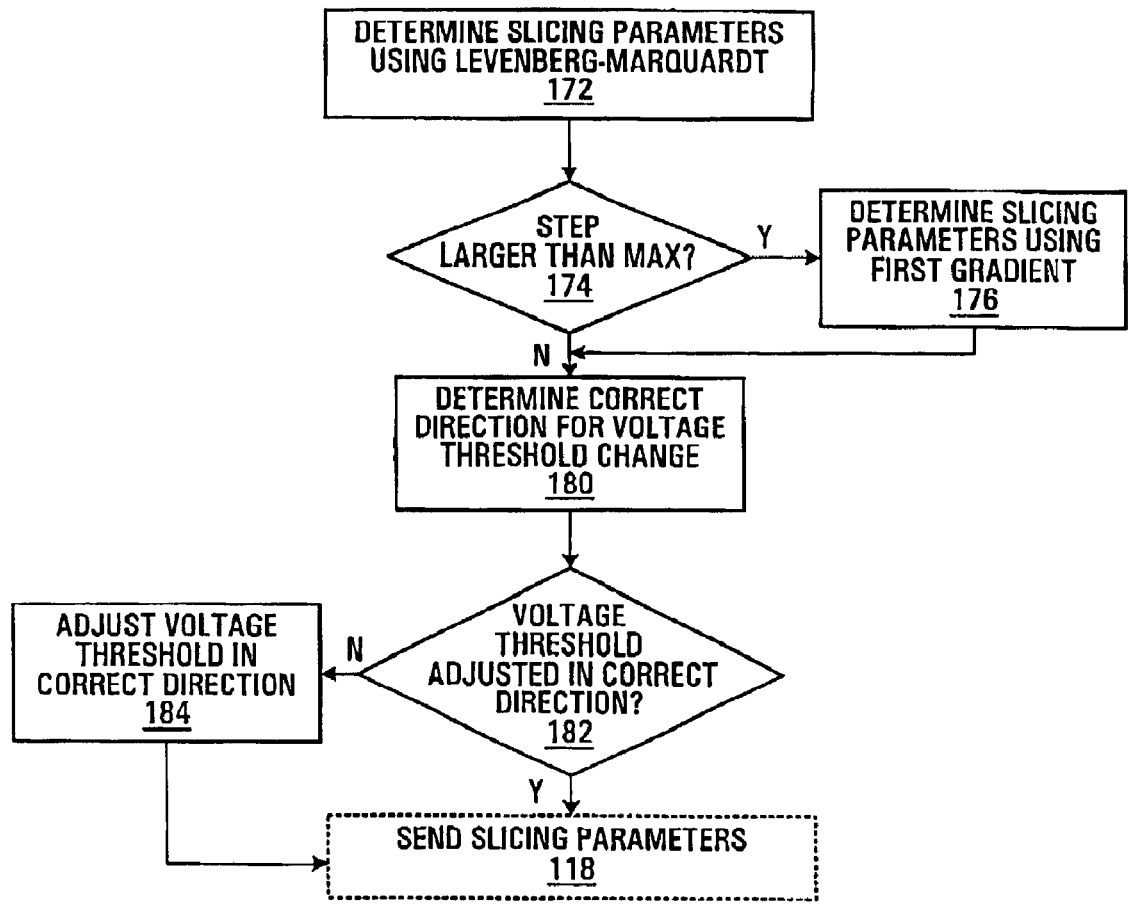
FIG. 8 is a flowchart of a portion of a method of adjusting at least one slicing parameter value according to another embodiment of the invention.

In one embodiment, the FEC 26 includes a corrected 1's counter and a corrected 0's counter, and includes processing to ensure that these counters correspond to 1's and 0's within signal 12 and not within the digital signal obtained after descrambling within the FEC 26. Many DW chips include these features. In this embodiment the at least one slicing parameter includes the voltage threshold. The corrected 1's counter and the corrected 0's counter are used as an additional sanity check when adjusting the voltage threshold at step 116 of FIG. 5. Referring to FIG. 8, a portion of an alternative method of adjusting the at least one slicing parameter value is shown. The steps prior to the step 172 of determining the at least one slicing parameter value using a Levenberg-Marquardt optimization (steps 160, 162, 164, 166, 168, and 170) are the same as described above with reference to FIG. 7, as are steps having the same reference number in FIG. 8 as in FIG. 7.

After determining the at least one new slicing parameter value at either step 172 or step 176, the DSP 22 reads the corrected 1's counter and the corrected 0's counter and determines a correct direction in which the voltage threshold is to be adjusted For example, suppose the upper voltage corresponds to 1's within the signal 12. If corrected 1's counter is larger than the corrected 0's counter, then more 1's are being corrected than are 0's and the voltage threshold should be lowered At step 182 the DSP 22 determines whether the voltage threshold has been adjusted in the correct direction by comparing $V_k$ and $V_{k-1}$. At step 184 the DSP 22 re-determines the voltage threshold by adjusting the voltage threshold in the correct direction but by the same magnitude. Since the current value of the voltage threshold has already been determined, the DSP 22 can adjust the voltage threshold in the correct direction by setting $$V_k = 2V_{k-1} - V_k.$$

Use of the corrected 1's counter and corrected 0's counter is not necessary, but if present in the FEC 26 can provide improved performance in optimizing the at least one slicing parameter. This is particularly true when the method of the invention is started or re-started (following for example card reboot or algorithm suspension under Alarm Indication Signal, Loss of Signal, Out of Frame, or other conditions) since the model in such circumstances will likely be very inaccurate until it has been updated by at least a few measured BERs and slicing parameter values. For the same reason, the use of the corrected 1's counter and corrected 0's counter to determine whether the voltage threshold is being adjusted in the correct direction is also particularly useful when a large change has occurred in the signal power.

The step of determining the offset of the card in order to initialize or re-initialize the at least one slicing parameter value is a preferable but optional step. Its inclusion will generally lead to faster convergence, but involves calibrating the card. In one alternative embodiment, only the offsets of the reference card are determined and subtracted from the reference card's $SP_{opt}$ curves so as to create mean case curves. This removes the need to calibrate each card individually. At the steps 102 and 164 or initializing and re-initializing the algorithm, the at least one slicing parameter is set using the $SP_{opt}$ curve determined for the reference card without considering the offset of the particular card.

In another alternative embodiment, initialization and re-initialization ignore offsets and $SP_{opt}$ curves altogether. At the steps 102 and 164 of initializing and re-initializing the algorithm, each of the at least one slicing parameter is set to a default value defined within hardware of the card 30 with no adjustment applied, commonly referred to as zero. At the steps 102, 136, and 146 of initializing or re-initializing the model or the covariance matrix, the coefficient vector is populated with zeros, and the covariance matrix is set to an identity matrix multiplied by a scaling factor, $$B_0 = \begin{bmatrix} 0 \\ \vdots \\ 0 \end{bmatrix} \text{ and } C_0 = \frac{1}{a}I$$

where I is an identity matrix and a is a small number in the range of approximately $10^{-4}$ to $10^{-6}$.

Calibration of the individual cards (i.e. determining an offset) may be avoided since the cards operate inline and the slicing parameters are moved consistently towards performance improvement following initialization, until the optimum is reached. Oscillation about the optimum values may be minimized by using a small value for the maximum step size. Of course any combination of reference card offset, individual card offset, or no offset may be used for any of the initializations or re-initializations.

The steps of determining whether there has been a power change larger than the power change threshold (step 134 of FIG. 6 and step 162 of FIG. 7) may be omitted if the timeframe is sufficiently small (for example, on the order of 10 ms) that a large power change is unlikely to occur or to be detected within the timeframe.

Collection of FEC corrected bit counts for the purposes of determining the BER in a way that ensures sufficient FEC error counts (steps 104, 106, and 108) may be carried out by repeatedly pausing for timeframes until at least one FEC corrected bit count is received or until a minimum number of FEC corrected bit counts are received. In other words, there is no predefined maximum number of timeframes. However this may result in extremely low values of the BER, with which the model cannot be updated meaningfully or for which an adjustment would be meaningless.

In the preferred embodiment of the invention a Levenberg-Marquardt optimization using a constant stepping parameter is used. Use of a constant stepping parameter is preferred because it reduces the need to repeatedly determine a value of the stepping parameter. However, in an alternative embodiment the stepping parameter is updated intermittently using any well known variant of the Levenberg-Marquardt optimization. In another alternative embodiment of the invention, optimization techniques other than the Levenberg-Marquardt technique may be used. For example, a Newton optimization method may be used.

The methods carried out by the DSP 22 have been described with respect to an embodiment in which the at least one slicing parameter includes both the voltage threshold and the phase sampling point, and coupling between the voltage threshold and the phase sampling point is taken into account. In an alternative embodiment, the at least one optimum threshold includes only the optimum voltage threshold. The same methods of generating a model and of determining the values of the slicing parameters are carried out as described above with reference to the preferred embodiment, but the model will have the form of $$z = a_0 + a_1 V + a_2 V^2,$$

with other expressions (such as the Hessian, the first gradient, the coefficient vector, and the vector of factors by which the model coefficients are multiplied) differing accordingly.

In another alternative embodiment, the at least one slicing parameter includes only the phase sampling point. The same methods of generating a model and of determining the values of the slicing parameters are carried out as described above with reference to the preferred embodiment, but the model will have the form of $$z = a_0 + a_3 \phi + a_4 \phi^2,$$

with other expressions (such as the Hessian, the first gradient, the coefficient model, and the vector of factors by which the model coefficients are multiplied) differing accordingly.

In yet another alternative embodiment, the at least one slicing parameter includes both the voltage threshold and the phase sampling point, but coupling between the voltage threshold and the phase sampling point is not taken into account. The same methods of generating a model and of determining the values of the slicing parameters are carried out as described above with reference to the preferred embodiment, but the model will have the form of $$z = a_0 + a_1 V + a_2 V^2 + a_3 \phi + a_4 \phi^2$$

with other expressions (such as the Hessian, the first gradient, the coefficient vector, and the vector of factors by which the model coefficients are multiplied) differing accordingly. The voltage threshold and phase sampling point can then be determined independently of each other.

Any method which is logically equivalent to the methods described above is within the scope of the present invention. For example, the step 138 of determining whether the model should not be updated may be carried out before the step 134 of determining whether a large change in signal power has occurred.

The methods have been described as being carried out by a DSP 22. More generally, the DSP 22 of FIG. 2 may be replaced by a slicing parameter estimator which carries out the methods of the invention described above. The slicing parameter estimator may be any combination of hardware or software, the logic of the methods taking the form of any combination of circuitry (including internal circuitry of an integrated circuit) or computer readable instructions. However, in the preferred embodiment the slicing parameter estimator is a DSP since a DSP provides the speed of a hardware implementation without the expense of a custom designed integrated circuit.

What has been described is merely illustrative of the application of the principles of the invention. Other arrangements and methods can be implemented by those skilled in the art without departing from the spirit and scope of the present invention.

We claim:

1. A method of determining a value of each of at least one slicing parameter for use in recovering bits in a received signal in a communication system so as to reduce a bit error rate (BER) of the received signal, the received signal having a bit rate and a signal power, the method comprising the steps of:

generating a second order polynomial model of the BER as a function of the at least one slicing parameter;

initializing each slicing parameter to a respective initial value;

repeatedly measuring the BER of the received signal from a Forward Error Correction (FEC) corrected bits counter; and for each measurement of the BER, the further steps of:

maintaining the model; and adjusting the at least one slicing parameter.

2. The method of claim 1 wherein the step of adjusting the at least one slicing parameter comprises the steps of:

determining whether the at least one slicing parameter is to be re-initialized;

determining a first gradient and a Hessian of the model;

determining from the Hessian and the first gradient whether a minimum exists within the model, if the at least one slicing parameter is not to be re-initialized;

determining the at least one slicing parameter using a Levenberg-Marquardt optimization and the Hessian and the first gradient, if the at least one slicing parameter is not to be re-initialized and if a minimum exists within the model; and determining the at least one slicing parameter from the first gradient, if the at least one slicing parameter is not to be re-initialized and if a minimum does not exist within the model.

3. The method of claim 1 wherein the step of measuring the BER of the received signal comprises the steps of:

clearing the FEC corrected bits counter;

repeatedly pausing for a timeframe and reading the FEC corrected bits counter upon expiry of each timeframe for as long as the FEC corrected bits counter is equal to zero and a number of timeframes less than a maximum number of timeframes has elapsed;

if the FEC corrected bits counter is larger than zero, setting the BER equal to the FEC corrected bits counter divided by the product of the timeframe, the number of timeframes for which the FEC corrected bits counter was read, and the bit rate; and if the FEC corrected bits counter is equal to zero, setting the BER equal to a nominal value.

4. The method of claim 1 wherein the step of maintaining the model comprises the steps of:

determining whether a change in signal power larger than a signal power change threshold has occurred since the at least one slicing parameter was last adjusted;

determining whether a prediction of the BER using the model in its current form would be satisfactory; and updating the model using a recursive least squares fit, if a change in signal power larger than a signal power change threshold has not occurred and if a prediction of the BER using the model in its current form would not be satisfactory.

5. A Digital Signal Processor (DSP) adapted to determine a value of at least one slicing parameter for use in recovering bits in a received signal in a communication system so as to reduce a bit error rate (BER), the received signal having a bit rate and a signal power, the DSP comprising:

instructions for generating a second order polynomial model of the BER as a function of the at least one slicing parameter;

instructions for initializing each slicing parameter to a respective initial value;

instructions for measuring the BER of the received signal from a Forward Error Correction (FEC) corrected bits counter;

instructions for maintaining the model upon each measurement of the BER; and instructions for adjusting the at least one slicing parameter upon each measurement of the BER.

6. The DSP of claim 5 wherein the instructions for adjusting the at least one slicing parameter comprise:

instructions for determining whether the at least one slicing parameter is to be re-initialized;

instructions for determining a first gradient and a Hessian of the model;

instructions for determining from the Hessian and the first gradient whether a minimum exists within the model;

instructions for determining the at least one slicing parameter using a Levenberg-Marquardt optimization and the Hessian and the first gradient, in the event that the at least one slicing parameter is not to be re-initialized and that a minimum exists within the model; and instructions for determining the at least one slicing parameter from the first gradient, in the event that the at least one slicing parameter is not to be re-initialized and that a minimum does not exist within the model.

7. The DSP of claim 6 wherein the instructions for determining whether the at least one slicing parameter is to be re-initialized comprise:

instructions for determining whether a change in signal power larger than a signal power change threshold has occurred since the at least one slicing parameter was last adjusted;

instructions for determining whether the BER is larger than a limit imposed by FEC capabilities; and instructions for determining that the at least one slicing parameter is to be re-initialized if a change in signal power larger than a signal power change threshold has occurred and if the BER is larger than the limit imposed by FEC capabilities.

8. The DSP of claim 6 further comprising:

instructions for determining a maximum step size from the signal power;

instructions for determining whether the at least one slicing parameter has been adjusted by more than the maximum step size, in the event that the at least one slicing parameter was determined using a Levenberg-Marquardt optimization; and instructions for determining the at least one slicing parameter using the first gradient of the model, in the event that the at least one slicing parameter has been adjusted by more than the maximum step size.

9. The DSP of claim 6 wherein the at least one slicing parameter includes a voltage threshold, and wherein the DSP further comprises:

instructions for reading and comparing a corrected 1's counter and a corrected 0's counter so as to determine a correct direction in which the voltage threshold is to be adjusted;

instructions for determining whether the voltage threshold was adjusted in the correct direction; and instructions for adjusting the voltage threshold in the correct direction in the event that the voltage threshold was not adjusted in the correct direction.

10. The DSP of claim 5 wherein the instructions for measuring the BER comprise:

instructions for clearing the FEC corrected bits counter;

instructions for repeatedly pausing for a timeframe and reading the FEC corrected bits counter upon expiry of the timeframe, for as long as the FEC corrected bits counter is equal to zero and a number of timeframes less than a maximum number of timeframes have elapsed;

instructions for setting the BER equal to the FEC corrected bits counter divided by the product of the timeframe and a bit rate of the received signal, in the event the FEC corrected bits counter is not equal to zero; and instructions for setting the BER equal to a nominal value, in the event that the FEC corrected bits counter is equal to zero.

11. The DSP of claim 5 wherein the at least one slicing parameter includes a voltage threshold and a phase sampling point, and wherein the instructions for generating a model account for coupling between the voltage threshold and the phase sampling point.

12. The DSP of claim 5 wherein the instructions for initializing the at least one slicing parameter comprise:

instructions for reading the signal power; and instructions for determining an approximate value for each slicing parameter from a respective model of the slicing parameter value as a function of signal power.

13. The DSP of claim 5 wherein the instructions for maintaining the model comprise:

instructions for determining whether the model is to be updated;

instructions for updating the model using a least squares fit, in the event that it is determined that the model is to be updated.

14. The DSP of claim 5 wherein the instructions for maintaining the model comprise:

instructions for determining whether the model is to be updated;

instructions for updating the model using a recursive least squares fit, in the event that it is determined that the model is to be updated.

15. The DSP of claim 14 wherein the instructions for determining whether the model is to be updated comprise:

instructions for determining whether a change in signal power larger than a signal power change threshold has occurred since the at least one slicing parameter was last adjusted;

instructions for determining whether a prediction of the BER using the model in its current form would be satisfactory; and instructions for determining that the model is to be updated in the event that a change in signal power larger than a signal power change threshold has not occurred and a prediction of the BER using the model in its current form would not be satisfactory.

16. The DSP of claim 15 further comprising:

instructions for re-initializing the model in the event that a change in signal power larger than a signal power change threshold has occurred; and instructions for preserving the model in the event that a prediction of the BER using the model in its current form would be satisfactory.

17. The DSP of claim 15 wherein the instructions for determining whether a prediction of the BER using the model in its current form would be satisfactory comprise:

instructions for determining a BER precision threshold from the BER;

instructions for determining a predicted BER from the model;

instructions for determining whether the BER differs from the predicted BER by less than the BER precision threshold;

instructions for determining whether the BER is larger than a limit imposed by FEC capabilities;

instructions for determining whether the BER is unchanged from when the model was last updated; and instructions for determining that a prediction of the BER using the model in its current form would be satisfactory if the BER differs from the predicted BER by less than the BER precision threshold or if the BER is larger than the limit imposed by FEC capabilities, or if the BER is unchanged from when the model was last updated.

18. The DSP of claim 17 further comprising:

instructions for re-initializing the model in the event that a change in signal power larger than the signal power change threshold has occurred; and instructions for preserving the model in the event that a prediction of the BER using the model in its current form would be satisfactory.

19. The DSP of claim 18 wherein the model comprises a covariance matrix and a coefficient vector, and wherein the DSP further comprises:

instructions for determining whether the covariance matrix is close to degeneration; and instructions for re-initializing the covariance matrix in the event that the covariance matrix is close to degeneration.

20. The DSP of claim 19 wherein the instructions for adjusting each slicing parameter comprise:

instructions for determining whether the at least one slicing parameter are to be re-initialized;

instructions for determining a first gradient and a Hessian of the model;

instructions for determining from the Hessian and the first gradient whether a minimum exists within the model;

instructions for determining the at least one slicing parameter using a Levenberg-Marquardt optimization and the Hessian and the first gradient, in the event that the at least one slicing parameter is not to be re-initialized and that a minimum exists within the model; and instructions for determining the at least one slicing parameter from the first gradient, in the event that the at least one slicing parameter is not to be re-initialized and that a minimum does not exist within the model.

21. The DSP of claim 20 wherein the instructions for determining whether the at least one slicing parameter is to be re-initialized comprise:

instructions for determining whether a change in signal power larger than a signal power change threshold has occurred since the at least one slicing parameter was last adjusted;

instructions for determining whether the BER is larger than a limit imposed by FEC capabilities; and instructions for determining that the at least one slicing parameter is to be re-initialized if a change in signal power larger than the signal power change threshold has occurred and if the BER is larger than the limit imposed by FEC capabilities.

22. The DSP of claim 21 wherein the at least one slicing parameter includes a voltage threshold, and wherein the DSP further comprises:

instructions for determining a maximum step size from the signal power;

instructions for determining whether the at least one slicing parameter has been adjusted by more than the maximum step size, in the event that the at least one slicing parameter was determined using a Levenberg-Marquardt optimization;

instructions for determining the at least one slicing parameter using the first gradient of the model, in the event that the at least one slicing parameter has been adjusted by more than the maximum step size;

instructions for reading and comparing a corrected 1's counter and a corrected 0's counter so as to determine a correct direction in which the voltage threshold is to be adjusted;

instructions for determining whether the voltage threshold was adjusted in the correct direction; and instructions for adjusting the voltage threshold in the correct direction in the event that the voltage threshold was not adjusted in the correct direction.

23. The DSP of claim 22 wherein the instructions for measuring the BER comprise:

instructions for clearing the FEC corrected bits counter;

instructions for repeatedly pausing for a timeframe and reading the FEC corrected bits counter upon expiry of each timeframe, for as long as the FEC corrected bits counter is equal to zero and a number of timeframes less than a maximum number of timeframes have elapsed;

instructions for setting the BER equal to the FEC corrected bits counter divided by the product of the timeframe, the number of timeframes for which the FEC corrected bits counter was read, and the bit rate, in the event that the FEC corrected bits counter is not equal to zero; and instructions for setting the BER equal to a nominal value, in the event the FEC corrected bits counter is equal to zero.

24. The DSP of claim 23 wherein the at least one slicing parameter further includes a phase sampling point, and wherein the instructions for generating a model account for coupling between the voltage threshold and the phase sampling point.

25. A card adapted to determine a value of at least one slicing parameter for use in recovering bits in a received signal in a communication system so as to reduce a bit error rate (BER) of the received signal, the received signal having a bit rate and a signal power, the card comprising:

a Forward Error Correction (FEC) chip adapted to generate a FEC corrected bits counter; and a Digital Signal Processor comprising:

instructions for generating a second order polynomial model of the BER as a function of the at least one slicing parameter;

instructions for initializing each slicing parameter to a respective initial value;

instructions for repeatedly measuring the BER of the received signal from the FEC corrected bits counter;

instructions for maintaining the model upon each measurement of the BER; and instructions for adjusting the at least one slicing parameter upon each measurement of the BER.

26. The card of claim 25 wherein the instructions for adjusting the at least one slicing parameter comprise:

instructions for determining whether the at least one slicing parameter is to be re-initialized;

instructions for determining a first gradient and a Hessian of the model;

instructions for determining from the Hessian and the first gradient whether a minimum exists within the model, in the event that the at least one slicing parameter is not to be re-initialized;

instructions for determining the at least one slicing parameter using a Levenberg-Marquardt optimization and the Hessian and the first gradient, in the event that the at least one slicing parameter is not to be re-initialized and that a minimum exists within the model; and instructions for determining the at least one slicing parameter from the first gradient, in the event that the at least one slicing parameter is not to be re-initialized and that a minimum does not exist within the model.

27. The card of claim 25 wherein the instructions for measuring the BER of a received signal comprise:

instructions for clearing the FEC corrected bits counter;

instructions for repeatedly pausing for a timeframe and reading the FEC corrected bits counter upon expiry of each timeframe, for as long as the FEC corrected bits counter is equal to zero and a number of timeframes less than a maximum number of timeframes have elapsed;

instructions for setting the BER equal to the FEC corrected bits counter divided by the product of the timeframe, the number of timeframes for which the FEC corrected bits counter was read, and the bit rate, in the event that the FEC corrected bit counter is not equal to zero; and instructions for setting the BER equal to a nominal value, in the event that the FEC corrected bits counter is equal to zero.

28. The card of claim 25 wherein the instructions for maintaining the model comprise:

instructions for determining whether a change in signal power larger than a signal power change threshold has occurred since the at least one slicing parameter was last adjusted;

instructions for determining whether a prediction of the BER using the model in its current form would be satisfactory; and instructions for updating the model using a recursive least squares fit, in the event that a change in signal power larger than the signal power change threshold has not occurred and a prediction of the BER using the model in its current form would not be satisfactory.

29. A slicing parameter estimator adapted to determine a value of at least one slicing parameter for use in recovering bits in a received signal in a communication system so as to reduce a bit error rate (BER), the received signal having a bit rate and a signal power, the slicing parameter estimator comprising:

instructions for generating a second order polynomial model of the BER as a function of the at least one slicing parameter;

instructions for initializing each slicing parameter to a respective initial value;

instructions for measuring the BER of the received signal from a Forward Error Correction (FEC) corrected bits counter;

instructions for maintaining the model upon each measurement of the BER; and instructions for adjusting the at least one slicing parameter upon each measurement of the BER.

30. The slicing parameter estimator of claim 29 wherein the instructions for adjusting the at least one slicing parameter comprise:

instructions for determining whether the at least one slicing parameter is to be re-initialized;

instructions for determining a first gradient and a Hessian of the model;

instructions for determining from the Hessian and the first gradient whether a minimum exists within the model, in the event that the at least one slicing parameter is not to be re-initialized;

instructions for determining the at least one slicing parameter using a Levenberg-Marquardt optimization and the Hessian and the first gradient, in the event that the at least one slicing parameter is not to be re-initialized and that a minimum exists within the model; and instructions for determining the at least one slicing parameter from the first gradient, in the event that the at least one slicing parameter is not to be re-initialized and that a minimum does not exist within the model.

31. The slicing parameter estimator of claim 29 wherein the instructions for measuring the BER of a received signal comprise:

instructions for clearing the FEC corrected bits counter;

instructions for repeatedly pausing for a timeframe and reading the FEC corrected bits counter upon expiry of each timeframe, for as long as the FEC corrected bits counter is equal to zero and a number of timeframes less than a maximum number of timeframes have elapsed;

instructions for setting the BER equal to the FEC corrected bits counter divided by the product of the timeframe, the number of timeframes for which the FEC corrected bits counter was read, and the bit rate, in the event that the FEC corrected bits counter is not equal to zero; and instructions for setting the BER equal to a nominal value, in the event that the FEC corrected bits counter is equal to zero.

32. The slicing parameter estimator of claim 29 wherein the instructions for maintaining the model comprise:

instructions for determining whether a change in signal power larger than a signal power change threshold has occurred since the at least one slicing parameter was last adjusted;

instructions for determining whether a prediction of the BER using the model in its current form would be satisfactory; and instructions for updating the model using a recursive least squares fit, in the event that a change in signal power larger than the signal power change threshold has not occurred and a prediction of the BER using the model in its current form would not be satisfactory.

* * * * *